(12) United States Patent
Müntnich et al.

(10) Patent No.: US 7,182,521 B2
(45) Date of Patent: Feb. 27, 2007

(54) AXIAL BEARING UNIT

(75) Inventors: Leo Müntnich, Treis-Karden (DE); Wolfgang Fugel, Nürnberg (DE); Alexander Reimchen, Herzogenaurach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 11/108,060

(22) Filed: Apr. 15, 2005

(65) Prior Publication Data

US 2005/0232529 A1    Oct. 20, 2005

Related U.S. Application Data

(63) Continuation of application No. PCT/EP03/11345, filed on Oct. 14, 2003.

(30) Foreign Application Priority Data

Oct. 18, 2002    (DE)    ................. 102 48 686

(51) Int. Cl.
F16C 19/10    (2006.01)
F16C 19/30    (2006.01)

(52) U.S. Cl. ..................... 384/606; 384/622

(58) Field of Classification Search ................ 384/368, 384/474, 475, 590, 606, 615, 617, 620, 621, 384/622

See application file for complete search history.

(56) References Cited

U.S. PATENT DOCUMENTS

| | | | | |
|---|---|---|---|---|
| 780,409 A * | 1/1905 | Conway et al. | ............. | 384/615 |
| 4,466,751 A * | 8/1984 | Higuchi | ...................... | 384/126 |
| 4,653,610 A * | 3/1987 | Tamura et al. | ............. | 184/6.12 |
| 4,658,584 A * | 4/1987 | Suzuki et al. | ................. | 60/450 |
| 4,696,588 A * | 9/1987 | Tanaka et al. | .............. | 384/615 |
| 4,934,842 A * | 6/1990 | Premiski et al. | ............ | 384/606 |
| 4,968,157 A | 11/1990 | Chiba | | |
| 5,335,998 A | 8/1994 | Müntnich et al. | | |
| 5,474,390 A * | 12/1995 | Rhoads | ....................... | 384/623 |
| 5,647,675 A * | 7/1997 | Metten et al. | .............. | 384/620 |
| 6,065,500 A * | 5/2000 | Metcalfe | ..................... | 138/118 |
| 6,394,660 B1 * | 5/2002 | Butler et al. | ................ | 384/620 |
| 6,827,498 B2 * | 12/2004 | Fugel et al. | ................ | 384/620 |

FOREIGN PATENT DOCUMENTS

| | | |
|---|---|---|
| DE | 40 40 414 A | 7/1992 |
| DE | 196 18 216 A | 12/1996 |
| GB | 1 187 290 A | 4/1970 |
| GB | 2 361 964 A | 11/2001 |
| JP | 2001-41252 | 2/2001 |

\* cited by examiner

Primary Examiner—Richard Ridley
Assistant Examiner—Justin Krause
(74) Attorney, Agent, or Firm—Henry M. Feiereisen

(57) ABSTRACT

An axial roller bearing includes two bearing disks placed in plane-parallel relationship to one another. Each bearing disk has a radial section to form a raceway and an axial collar connected to the radial section, wherein the collar of one bearing disk and the collar of the other bearing disk overlap one another. The axial collars are arranged on an inner or outer peripheral edge of the bearing disks and have breaches to define at least one opening of variable size in dependence on a relative rotation of the bearing disks in circumferential direction. A cage is disposed between the bearing disks for accommodating rolling elements.

11 Claims, 2 Drawing Sheets

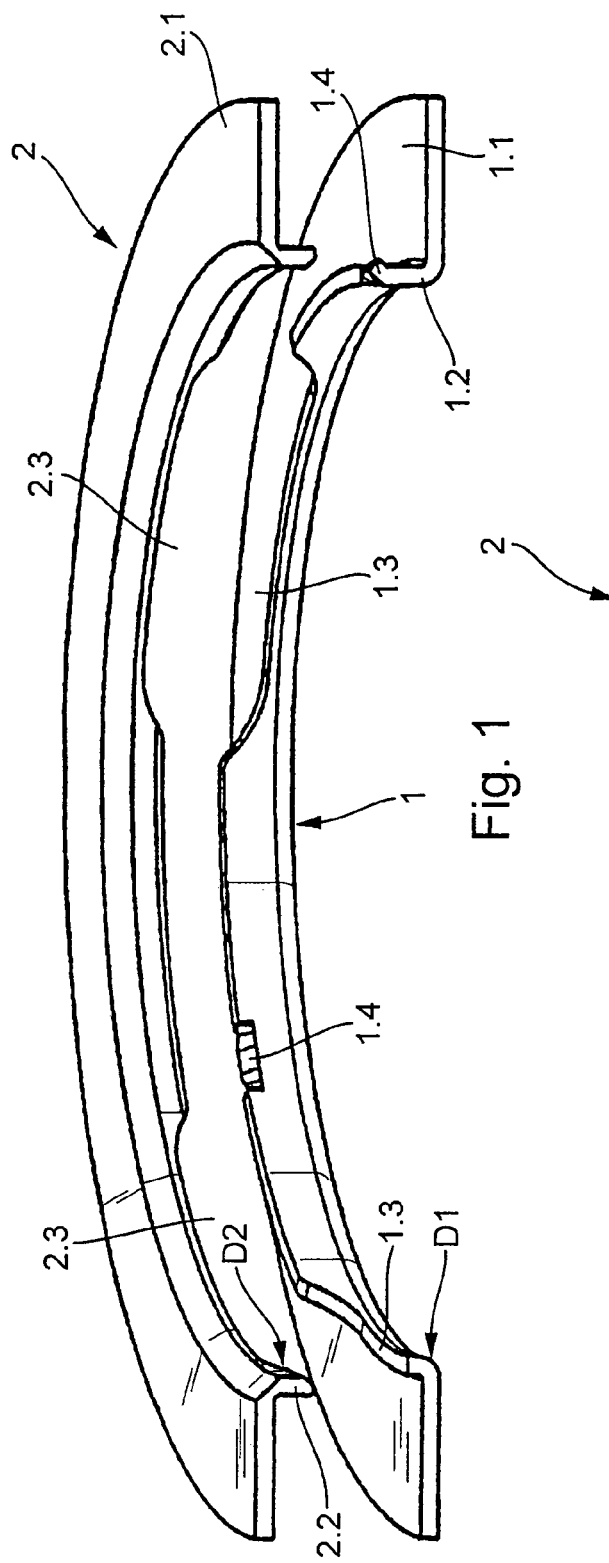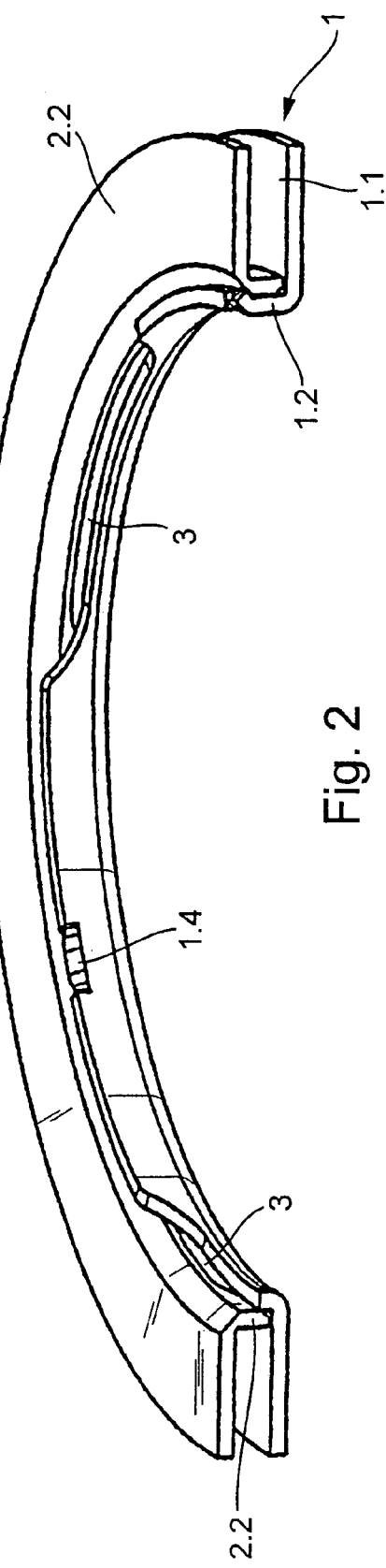
Fig. 1
Fig. 2

AXIAL BEARING UNIT

CROSS-REFERENCES TO RELATED APPLICATIONS

This application is a continuation of prior filed copending PCT International application no. PCT/EP2003/011345, filed Oct. 14, 2003, which designated the United States and on which priority is claimed under 35 U.S.C. §120 and which claims the priority of German Patent Application, Serial No. 102 48 686.7, filed Oct. 18, 2002, pursuant to 35 U.S.C. 119(a)–(d).

BACKGROUND OF THE INVENTION

The present invention relates, in general, to an axial bearing unit.

Nothing in the following discussion of the state of the art is to be construed as an admission of prior art.

U.S. Pat. No. 5,335,998 describes an axial bearing unit having two bearing disks with radial sections to form raceways for rolling elements received in a cage. Both radial sections of the bearing disks are formed about their inner peripheral edge with an axial collar, whereby the collar of one radial section and the collar of the other radial section oppose one another, and one collar embraces the other collar. Each of the bearing disks has a central bore, whereby the bores of the both bearing disks have different diameter. The bearing disks are held together by providing the collar of the bearing disk of smaller bore diameter with a retaining lug which is directed radially outwards and engages behind the collar of the other bearing disk. For reasons of lubrication, the collar of the bearing disk of smaller bore diameter is provided with recesses which are evenly spaced about the circumference of the collar. The provision of such recesses allows only very limited lubrication of the axial bearing unit because lubricant can enter from the outside into the bearing interior only via a very narrow gap. In other words, the flow of lubricant must overcome substantial resistance from the bearing unit.

It would therefore be desirable and advantageous to provide an improved axial bearing unit to obviate prior art shortcomings and to improve lubrication.

SUMMARY OF THE INVENTION

According to one aspect of the present invention, an axial roller bearing includes two bearing disks placed in plane-parallel relationship to one another, with each bearing disk having a radial section to form a raceway and an axial collar connected to the radial section, wherein the collar of one bearing disk and the collar of the other bearing disk overlap one another, with the axial collars being arranged on a peripheral edge of the bearing disks and having breaches to define at least one opening of variable size in dependence on a relative rotation of the bearing disks in circumferential direction, and a cage, disposed between the bearing disks, for accommodating rolling elements.

It is to be understood by persons skilled in the art that the term "breach" is used here in a generic sense and relates to any material interruption of any shape in order to define an opening for passage of lubricant.

According to another feature of the present invention, the opening has a maximum value, when the breaches of the collars are positioned coextensively, and has a minimum value of zero in the absence of an overlap between the breaches of the collars. In other words, when the breaches of the collars are in coincidence, the resistance of the bearing unit against a passage of lubricant is at a minimum as the opening has a maximum dimension and thus provides a large through-flow area for lubricant. As the collars are turned relative to one another, the opening progressively decreases in size to reduce the through-flow area so that the flow resistance in the bearing unit rises. When the overlap of the breaches is zero, lubricant is then able to flow only through the narrow gap between the collars of the bearing disks. Thus, varying operational conditions can be established depending on the degree of overlap between the breaches, ranging from an open bearing unit (maximum coincidence of the breaches) to a closed bearing (absence of overlap between the breaches). This continuous change in the size of the opening has the advantage that lubricant, e.g. oil, can flow through the bearing at maximum amounts, on one hand, while a flow of lubricant can be decreased, on the other hand, to positively affect the oil supply to other consumers. In addition, lubrication of the collars that glide on one another is improved.

As described above, the breaches can be configured in any geometric shape or form and can be arranged relative to one another in any suitable manner. The breaches of the collars may be designed geometrically different or arranged asymmetrical to one another.

According to another feature of the present invention, the breaches may be implemented by recesses in circumferential direction of the collars of the bearing disks.

Thus, when the position of the recesses of the collars coincides in circumferential direction, the formed opening assumes a maximum value to thereby reduce the resistance of the bearing unit against a passage of lubricant. By providing each collar with several recesses in circumferential spaced-apart relationship, this resistance can further be decreased when the recesses are in coincidence. As the bearing disks of the axial bearing unit change their relative disposition from the maximum coincidence between the recesses, the formed opening or openings are reduced in size.

According to another feature of the present invention, the breaches may have an axial extension reaching to an area of the raceways of the bearing disks. In this way, a maximum extension of the opening in axial direction is realized.

According to another feature of the present invention, one of the collars may include a radially extending retaining element for snapping behind the other one of the collars to thereby hold the bearing disks captive and to form a unitary structure.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is an exploded perspective illustration of two bearing disks configured in accordance with the present invention for an axial bearing unit;

FIG. 2 is a perspective illustration of the bearing disks in assembled state.

DETAILED DESCRIPTION OF PREFERRED EMBODIMENTS

Figure 3:
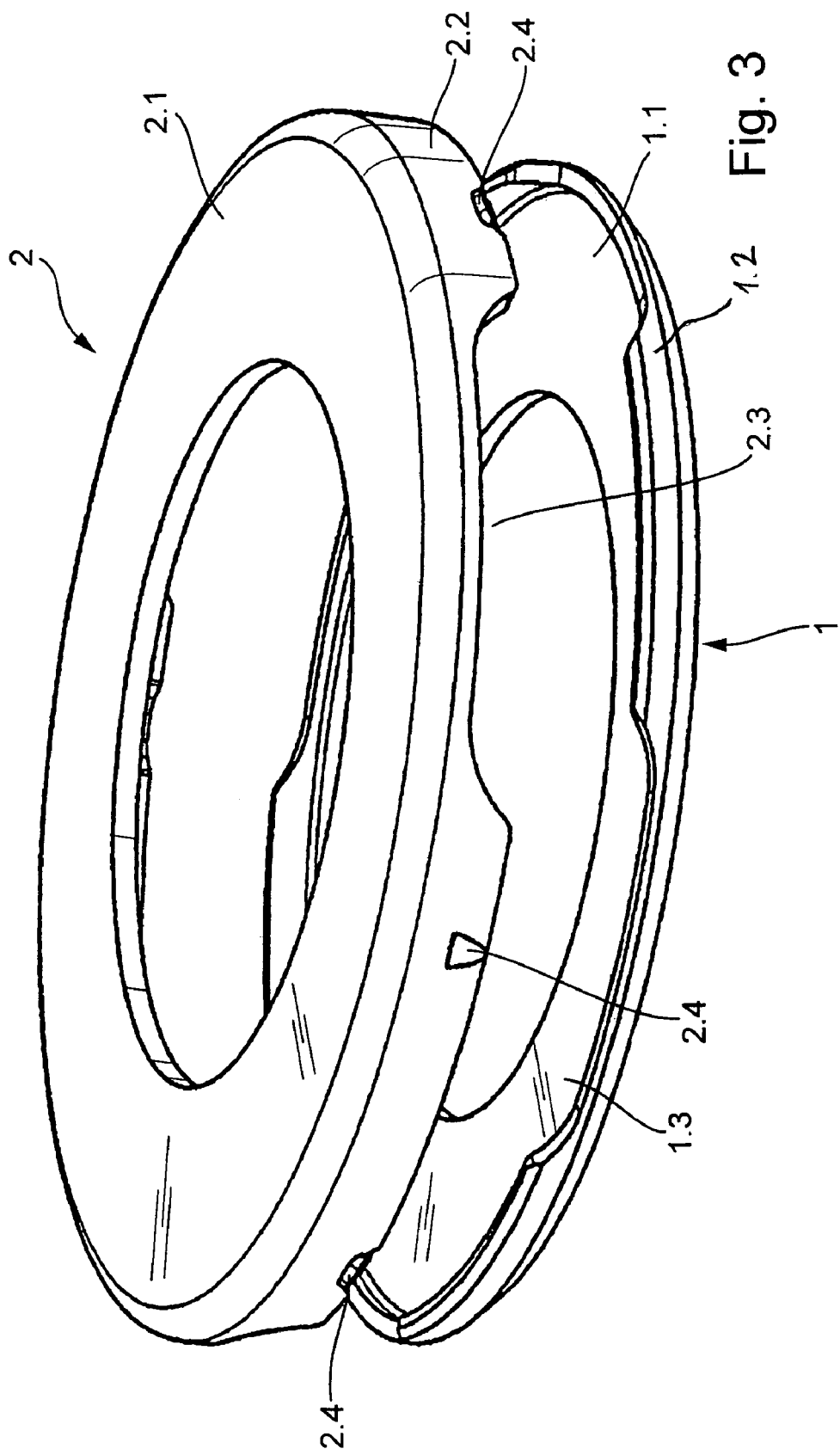
FIG. 3 is an exploded perspective illustration of a variation of two bearing disks configured in accordance with the present invention for an axial bearing unit.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exploded perspective illustration of two bearing disks 1, 2 configured in accordance with the present invention for an axial bearing unit which is not shown in more detail for the sake of simplicity. The bearing disk 1 has a radial section 1.1 and the bearing desk 2 has a radial section 2.1, whereby the radial sections 1.1, 2.1 provide a raceway for unillustrated rolling elements which are guided in an unillustrated cage disposed between the bearing disks 1, 2. Connected to an inner peripheral edge of the radial section 1.1 is an axial collar 1.2, and connected to an inner peripheral edge of the radial section 2.1 is an axial collar 2.2. The collars 1.2, 2.2 oppose one another, with the collar 1.2 of the bearing disk 1 embracing the collar 2.2 of the bearing disk 2. As a result, the bearing disk 1 has a central bore defined by a diameter D1 which is smaller than a diameter D2 of a central bore of the bearing disk 2.

Both, the collar 1.2 of the bearing disk 1 and the collar 2.2 of the bearing disk 2, are provided with several breaches in the form of elongate recesses 1.3, 2.3 which are open to one side and rounded at the end and which are spaced from one another in circumferential direction. When assembling the bearing disks 1, 2 by moving the bearing disks 1, 2 in axial direction toward one another and snapping them together, as shown in FIG. 2, the recesses 1.3, 2.3 define openings 3 which can vary in size depending on the relative position of the bearing disks 1, 2. In other words, a change in position of one of the bearing disks 1, 2 relative to the other one of the bearing disks 1, 2, results in an increase or decrease of the size of the openings 3. When the bearing disks 1, 2 assume a position in which the recesses 1.3, 2.3 coincide or are arranged coextensively, the openings 3 have a maximum size in circumferential direction to allow passage of a maximum amount of lubricant. On the other hand, when the bearing disks 1, 2 assume a relative position in which there is no overlap between the recesses 1.3, 2.3 of the bearing disks 1, 2, the size of the openings 3 is zero so that lubricant is unable to pass and can only flow through a gap between the bearing disks 1, 2. The change in position between the bearing disks 1, 2 occurs when in certain operational stages, for example during use of the axial bearing unit in converters of automobile transmissions, the shaft disk is lifted in axial direction from the rolling elements.

The size of the openings 3 may also be influenced by the axial depths of the recesses 1.3, 2.3. By extending the recesses 1.3, 2.3 to the area of the raceway, i.e. to the area of the radial sections 1.1, 2.1, the openings 3 have maximum size.

In the absence of an overlap or coincidence between the recesses 1.3, 2.4, the size of the opening 3 is zero, i.e., no opening exists. Depending on the circumferential position between the bearing disks 1, 2, the size of the openings 3 thus ranges between a maximum value and a zero value.

The bearing unit, as shown in FIG. 2, is held together by the provision of an elastic retaining element 1.4 which is arranged on the collar 1.2 of the (lower) bearing disk 1 and embraces the (upper) bearing disk 2. A bearing unit of this type is also designated as "interiorly guided" because the collars 1.2, 2.2 are arranged on an inner peripheral edge. Lubrication of this bearing unit takes place radially from inside to the outside, whereby lubricant enters the bearing interior through the openings 3 to flow through the outwardly open space defined by the bearing disks 1, 2 and accommodating the rolling elements.

Referring now to FIG. 3, there is shown an exploded perspective illustration of a variation of the two bearing disks 1, 2 configured in accordance with the present invention for an exteriorly guided axial bearing unit. In other words, the radially opposing collars 1.2, 2.2 are arranged on an outer peripheral edge of the bearing disks 1, 2. In the example of FIG. 3, the collar 2.2 of the bearing disk 2 embraces the collar 1.2 of the bearing disk 1. The bearing disks 1, 2 are held together by a retaining element 2.4 which is formed on the bearing disk 2 and which is directed radially inwards and embraces the bearing disk 1. In contrast to the embodiment of FIG. 2, lubricant flows through the bearing unit in reverse order. In other words, lubricant enters the bearing interior through the radially outer openings 3 to flow through the intermediate space defined by the bearing disks 1, 2 and accommodating the rolling elements, and exits the radially inwardly open bearing via the two spaced-apart bearing disks 1, 2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An axial roller bearing, comprising:
   two bearing disks placed in plane-parallel relationship to one another for accommodating rolling elements therebetween, each bearing disk comprised of a radial section to form a raceway and an axial collar connected to the radial section, wherein the collar of one bearing disk and the collar of the other bearing disk overlap one another, said axial collars being arranged on a peripheral edge of the bearing disks and having breaches to define at least one opening of variable size in dependence on a relative rotation of the bearing disks in circumferential direction.

2. The axial roller bearing of claim 1, wherein the bearing disks are made of sheet metal.

3. The axial roller bearing of claim 1, wherein the peripheral edge is an inner edge of the bearing disks.

4. The axial roller bearing of claim 1, wherein the peripheral edge is an outer edge of the bearing disks.

5. The axial roller bearing of claim 1, wherein the opening has a maximum value, when the breaches of the collars are positioned coextensively, and has a minimum value of zero in the absence of an overlap between the breaches of the collars.

6. The axial roller bearing of claim 1, wherein the breaches are recesses in circumferential direction of the collars of the bearing disks.

7. The axial roller bearing of claim 1, wherein each of the collars has more than one of said breach in circumferential spaced-apart relationship to define more than one of said opening.

8. The axial roller bearing of claim 1, wherein the breaches are configured to extend in an axial direction towards an area of the raceways.

9. The axial roller bearing of claim 1, wherein one of the collars includes a radially extending retaining element for snapping behind the other one of the collars to thereby hold the bearing disks captive and to form a unitary structure.

10. An axial roller bearing, comprising two bearing disks disposed upon and rotatable relative to one another, each bearing disk constructed to have a breach, wherein the breach of one bearing disk and the breach of the other bearing disk interact such as to define an opening of variable size in response to a rotation of the bearing disks to thereby control a through-flow area for lubricant.

11. The axial roller bearing of claim 10, wherein the opening is at a maximum for passage of a greatest amount of lubricant, when the breaches of the bearing disks are in coincidence, and at zero in the absence of an overlap between the breaches.

* * * * *